(12) United States Patent
Tian et al.

(10) Patent No.: US 12,235,194 B2
(45) Date of Patent: Feb. 25, 2025

(54) CORING DEVICE

(71) Applicants: China Oilfield Services Limited, Tianjin (CN); China National Offshore Oil Corporation, Beijing (CN)

(72) Inventors: Zhibin Tian, Hebei (CN); Tao Lu, Hebei (CN); Lin Huang, Hebei (CN); Zanqing Wei, Hebei (CN); Tiemin Liu, Hebei (CN); Yongren Feng, Hebei (CN); Xiaodong Chu, Hebei (CN); Yong Jiang, Hebei (CN)

(73) Assignees: China Oilfield Services Limited, Tianjin (CN); China National Offshore Oil Corporation, Beijing (CN)

( * ) Notice: Subject to any disclaimer, the term of this patent is extended or adjusted under 35 U.S.C. 154(b) by 318 days.

(21) Appl. No.: 17/776,125

(22) PCT Filed: Apr. 7, 2021

(86) PCT No.: PCT/CN2021/085835
§ 371 (c)(1),
(2) Date: May 11, 2022

(87) PCT Pub. No.: WO2022/021930
PCT Pub. Date: Feb. 3, 2022

(65) Prior Publication Data
US 2022/0397491 A1    Dec. 15, 2022

(30) Foreign Application Priority Data

Jul. 28, 2020    (CN) .......................... 202010737790.7

(51) Int. Cl.
*G01N 1/08*    (2006.01)
(52) U.S. Cl.
CPC ..................................... *G01N 1/08* (2013.01)

(58) Field of Classification Search
CPC ............ G01N 1/08; G01N 1/14; G01N 33/34; G01V 11/002; E21B 49/06; E21B 49/10
See application file for complete search history.

(56) References Cited

U.S. PATENT DOCUMENTS

| | | | |
|---|---|---|---|
| 5,817,937 A * | 10/1998 | Beshoory | E21B 4/02 |
| | | | 73/152.46 |
| 10,100,627 B2 * | 10/2018 | Blangé | E21B 7/068 |

(Continued)

FOREIGN PATENT DOCUMENTS

| | | |
|---|---|---|
| CN | 101037941 A | 9/2007 |
| CN | 101532373 A | 9/2009 |

(Continued)

OTHER PUBLICATIONS

Translation of CN203008834.*

(Continued)

*Primary Examiner* — Helen C Kwok
(74) *Attorney, Agent, or Firm* — Banner & Witcoff, Ltd.

(57) ABSTRACT

A coring device, comprising an electronic sub communicated with a ground control system and identifying the position of a core taken underground, a supporting arm sub for fixing the coring device, a rotating sub for rotating a mechanical sub to a specified position to carry out coring by rotating, a hydraulically controlled sub for providing power to the rotating sub and the mechanical sub, a mechanical sub for performing pushing, coring, core folding and core length measurement operations, and a core storage barrel sub for storing a taken core, which are sequentially connected. The rotating sub comprises a rotating shaft, a moving sleeve which sleeves the rotating shaft and is in threaded connection with the rotating shaft, and a fixed housing; the rotating shaft and the moving sleeve are arranged inside the fixed (Continued)

housing, two ends of the rotating shaft respectively extend from two ends of the fixed housing.

17 Claims, 2 Drawing Sheets

(56) References Cited

U.S. PATENT DOCUMENTS

| | | | | |
|---|---|---|---|---|
| 2002/0116130 | A1* | 8/2002 | Estes | E21B 47/022 |
| | | | | 702/9 |
| 2007/0144783 | A1* | 6/2007 | Gleitman | E21B 4/18 |
| | | | | 175/50 |
| 2018/0038218 | A1* | 2/2018 | Hay | E21B 44/00 |
| 2019/0271227 | A1* | 9/2019 | Peters | E21B 47/024 |
| 2020/0271632 | A1* | 8/2020 | Muller | G01N 33/182 |
| 2021/0032987 | A1* | 2/2021 | Seltzer | G01N 1/28 |
| 2021/0123344 | A1* | 4/2021 | Westacott | E21B 49/08 |

FOREIGN PATENT DOCUMENTS

| | | |
|---|---|---|
| CN | 202596725 U | 12/2012 |
| CN | 203008834 U | 6/2013 |
| CN | 104373119 A | 2/2015 |
| CN | 205135491 U | 4/2016 |
| CN | 106285669 A | 1/2017 |
| CN | 107060661 A | 8/2017 |
| CN | 206668256 U | 11/2017 |
| CN | 206972226 U | 2/2018 |
| CN | 110926859 A | 3/2020 |
| CN | 111157701 A | 5/2020 |
| CN | 111855271 A | 10/2020 |
| JP | 2014177833 A | 9/2014 |

OTHER PUBLICATIONS

Translation of CN107060661.*
Dec. 9, 2022—(CN) First Office Action—App 2022010737790.7.
Jun. 24, 2021—International Search Report and Written Opininon of Appln No. PCT/CN2021/085835.
Dec. 9, 2022—(CN) First Office Action—App 202010737790.7.

* cited by examiner

CORING DEVICE

CROSS-REFERENCE TO RELATED APPLICATIONS

The present disclosure is a U.S. National Phase Entry of International Application PCT/CN2021/085835 having an international filing date of Apr. 7, 2021, which claims priority of Chinese patent application 202010737790.7, filed on Jul. 28, 2020, and the contents disclosed in the above-mentioned applications are hereby incorporated as a part of this application.

TECHNICAL FIELD

Embodiments of the present application relate to, but are not limited to, the field of logging instruments, in particular to a coring instrument (device).

BACKGROUND

In some technologies of downhole coring operations, azimuth information of taken core is very important for a downhole heterogeneous formation, and meanings represented by the cores at different azimuths vary greatly, azimuths and fractures of cores are very important for geologists. However, coring instruments in some technologies are only able to complete the coring operations downhole, and cannot accurately identify the azimuth of the cores downhole, much less directly drill a core in a certain azimuth downhole.

SUMMARY

The following is a summary of the subject matters described in detail herein. This summary is not intended to limit the protection scope of the claims.

An embodiment of the present application provides a coring instrument that can identify the azimuth in which the instrument is located downhole and drill a core in a specified azimuth.

An embodiment of the application provides a coring instrument which includes an electronic sub, a support arm sub, a rotary sub, a hydraulic control sub, a mechanical sub and a core reserving drum sub which are connected in sequence.

The mechanical sub is configured to complete operations of thrusting, coring, core-breaking and core length measurement; the core reserving drum sub is configured to reserve a taken core; the electronic sub is configured to communicate with a ground control system and identify an azimuth of the core taken downhole; the rotary sub is configured to rotate the mechanical sub to a specified azimuth for rotary coring; the hydraulic control sub is configured to provide power for the rotary sub and the mechanical sub; the support arm sub is configured to fix a position of the coring instrument in the downhole.

The rotary sub includes a rotating shaft, a moving sleeve and a fixed shell, the moving sleeve is sleeved outside the rotating shaft and is in threaded connection with the rotating shaft; the rotating shaft and the moving sleeve are arranged in the fixed shell, and two ends of the rotating shaft extend out of two ends of the fixed shell respectively, and the rotating shaft is axially limited in the fixed shell; an end face of the fixed shell close to the hydraulic control sub is provided with an oil inlet, and the hydraulic control sub is configured to inject hydraulic oil into the fixed shell through the oil inlet to push the moving sleeve to move axially.

The coring instrument provided by the embodiment of the present application can accurately measure the azimuth of the instrument during coring, and adjust the azimuth of the coring instrument according to the azimuth, to drill the core at the desired azimuth. After the coring instrument of the embodiment of the present application completes coring, relevant personnel (such as geologists) analyze the core, figure out the porosity, the permeability and the saturation of the formation, which together with the azimuth information of the core, may make the analyzed formation data be more accurate, provide more effective information for reservoir evaluation and greatly enhance the utilization value of the taken core.

Other features and advantages of the present application will be described in the following specification, and other aspects will become apparent upon reading and understanding of the drawings and detailed description.

BRIEF DESCRIPTION OF DRAWINGS

Accompanying drawings are used to provide a further understanding of technical solutions of the present application, and constitute a part of the specification, they are used together with embodiments of the present application to explain the technical solutions of the present application, and do not constitute a restriction on the technical solutions of the present application.

DESCRIPTION OF REFERENCE SIGNS

1—electronic sub, 2—support arm sub, 21—supporting and fixing arm, 3—rotary sub, 31—rotating shaft, 311—first limiting part, 312—second limiting part, 313—wire channel, 32—moving sleeve, 33—fixed shell, 331—sleeve, 332—fixed flange, 333—fixed sleeve, 334—first oil inlet, 335—second oil inlet, 34—rotating disk, 4—hydraulic control sub, 41—reverse thrusting arm, 42—upper thrusting arm, 5—mechanical sub, 51—lower thrusting arm, 6—core reserving drum sub, 71—first cavity, 72—second cavity, 73—channel, 81—ground control system, 82—intermediate transmission device, 83—coring instrument.

DETAILED DESCRIPTION

Hereinafter, embodiments of the present application will be described in detail with reference to the accompanying drawings. The embodiments in the present application and the features in the embodiments may be combined with each other randomly if there is no conflict.

Figure 1:
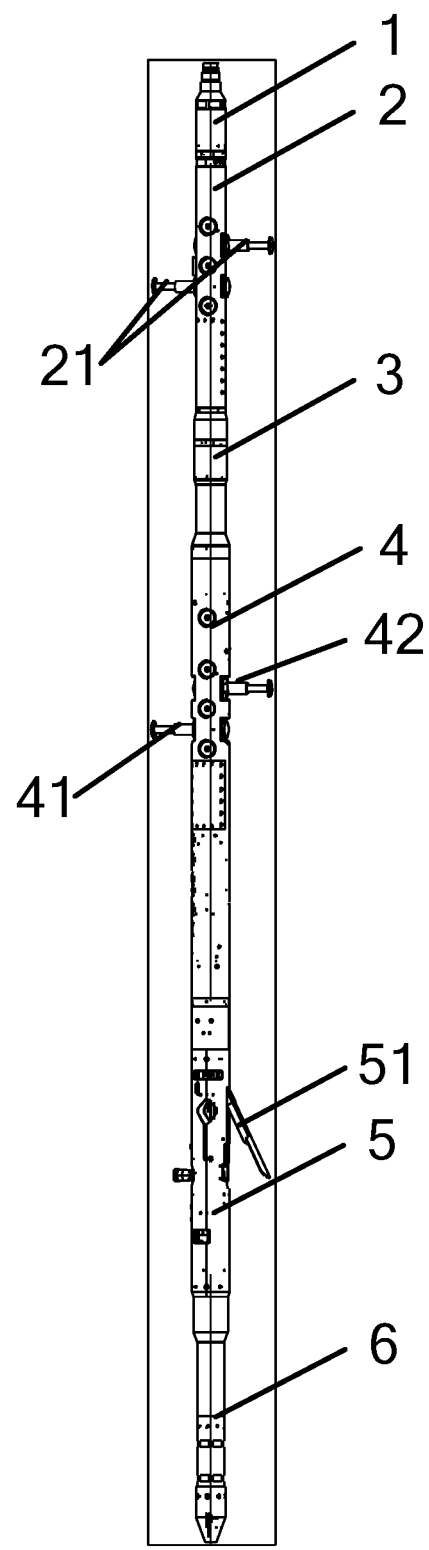
FIG. 1 is a schematic structural diagram of a coring instrument in an embodiment of the present application.

An embodiment of the present application provides a coring instrument 83, as shown in FIG. 1, the coring instrument 83 includes an electronic sub 1, a support arm sub 2, a rotary sub 3, a hydraulic control sub 4, a mechanical sub 5 and a core reserving drum sub 6 which are connected in sequence.

The mechanical sub 5 is configured to complete operations of thrusting, coring, core-breaking (i.e., breaking a core) and core length measurement. The core reserving drum sub 6 is configured to reserve a taken core. The electronic sub 1 is configured to communicate with a ground control system 81, and identify an azimuth of a core taken downhole, and may also be configured to control actions of the support arm sub 2, the hydraulic control sub 4, the rotary sub 3 and the mechanical sub 5. The rotary sub 3 is configured to rotate the mechanical sub 5 to a specified azimuth for rotary coring. The hydraulic control sub 4 is configured to provide power for the rotary sub 3 and the mechanical sub 5. The support arm sub 2 is configured to fix a position of the coring instrument 83 downhole.

Figure 3:
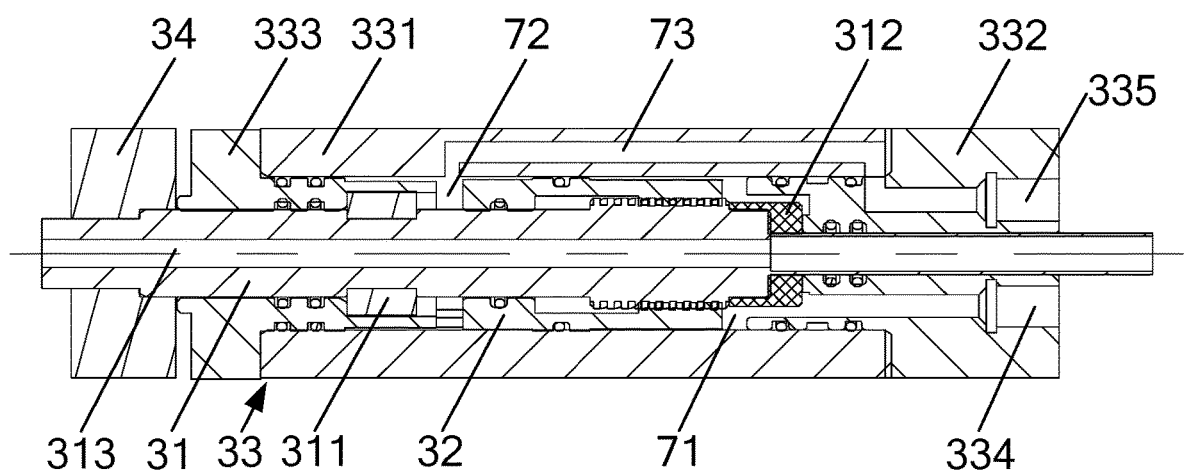
FIG. 3 is a schematic structural diagram of the rotary sub in the embodiment of the present application.

As shown in FIG. 3, the rotary sub 3 includes a rotating shaft 31, a moving sleeve 32 and a fixed shell 33. The moving sleeve 32 is sleeved outside the rotating shaft 31 and is in threaded connection with the rotating shaft 31. The rotating shaft 31 and the moving sleeve 32 are arranged in the fixed shell 33, and two ends of the rotating shaft 31 extend out of two ends of the fixed shell 33 respectively, and the rotating shaft 31 is axially limited in the fixed shell 33. An end face of the fixed shell 33 close to the hydraulic control sub 4 is provided with an oil inlet, and the hydraulic control sub 4 is configured to inject hydraulic oil into the fixed shell 33 through the oil inlet to push the moving sleeve 32 to move axially.

Figure 2:
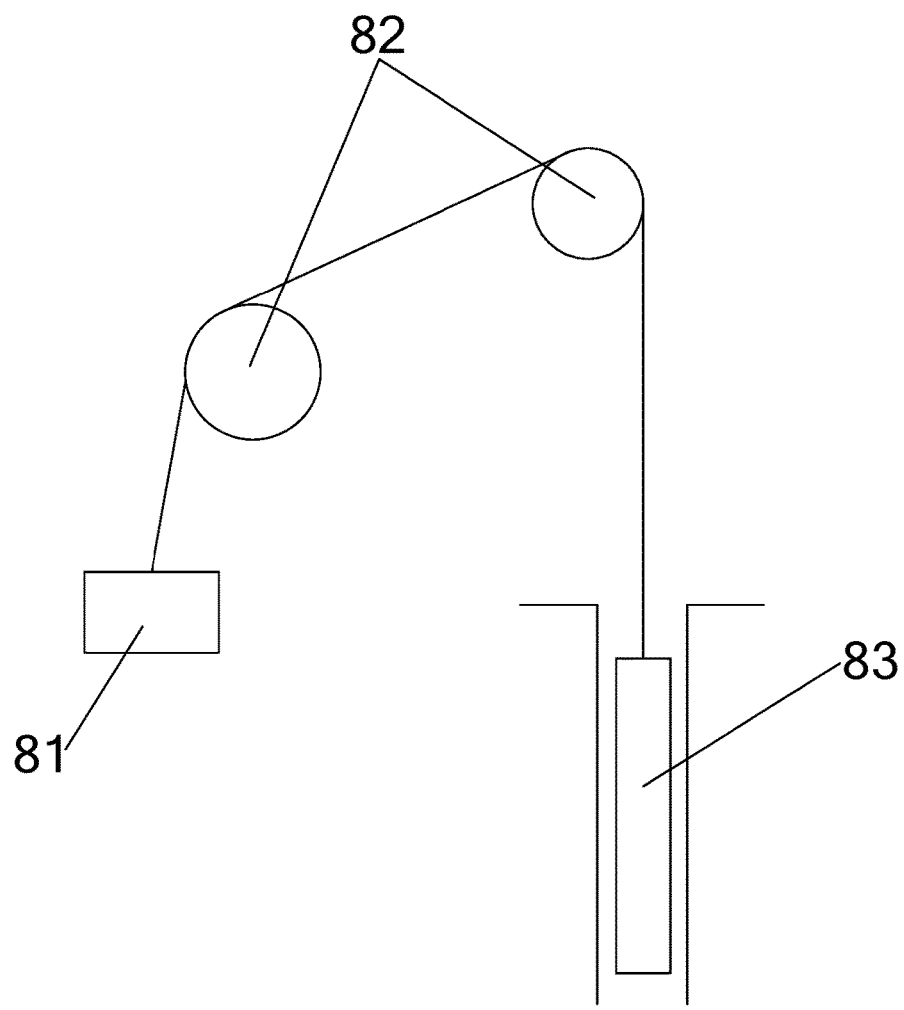
FIG. 2 is a schematic diagram of a working system of a coring instrument in an embodiment of the present application.

As shown in FIG. 2, the coring instrument 83 goes downhole to work, and the ground control system 81 may be arranged on the ground, the ground control system 81 may be configured to be able to receive commands, send commands, collect and process data, etc., and provide a control power supply and a power supply. The ground control system 81 may include a ground operation control panel, a large motor DC power, a small motor DC power, a ground monitoring industrial personal computer, a generator, a collector ring and other electric control accessories, etc. The ground control system 81 runs the coring instrument 83 into the well through an intermediate transmission device 82 for logging operation.

In the coring instrument 83, the mechanical sub 5 is configured to complete operations of thrusting, coring, core-breaking and core length measurement. The core reserving drum sub 6 is configured to reserve a taken core. The electronic sub 1 is configured to communicate with the ground control system 81, the electronic sub 1 can receive instructions sent by the ground control system 81, and command the downhole instrument to complete a series of coring actions according to requirements of the instructions transmitted by the control system, also can collect an instrument status of the mechanical sub 5 for reference by the operator. The rotary sub 3 is configured to rotate the mechanical sub 5 to a specified azimuth for rotary coring. The hydraulic control sub 4 is configured to provide power for the rotary sub 3, and the support arm sub 2 is configured to fix the position of the coring instrument 83 downhole. Only after the downhole position of the coring instrument 83 is fixed and an upper structure of the rotary sub 3 (an end of the rotary sub 3 away from the hydraulic control sub 4) is fixed, the rotary operation can be carried out.

The hydraulic oil may be injected into the fixed shell 33, and the moving sleeve 32 is pushed by the pressure of the high-pressure hydraulic oil to move axially. Since the moving sleeve 32 is in threaded connection with the rotating shaft 31, the moving sleeve 32 may drive the rotating shaft 31 to rotate while moving axially, thus controlling the rotation of the lower mechanical sub 5 through the rotating shaft 31.

In an exemplary embodiment, as shown in FIG. 3, the oil inlet includes a first oil inlet 334 and a second oil inlet 335, the moving sleeve 32 is in dynamic seal with the fixed shell 33, and a sealed first cavity 71 and a sealed second cavity 72 are formed on two sides of the moving sleeve 32, the first oil inlet 334 communicates with the first cavity 71 and the second oil inlet 335 communicates with the second cavity 72.

Taking the example shown in FIG. 3, when the hydraulic oil is injected into the first cavity 71 through the first oil inlet 334, the moving sleeve 32 is pushed to move towards the left and the rotating shaft 31 rotates forward, when the hydraulic oil is injected into the second cavity 72 through the second oil inlet 335, the moving sleeve 32 is pushed to move towards the right and the rotating shaft 31 rotates backward. When the rotating shaft 31 rotates forward or backward, it is possible to drive the mechanical sub 5 to rotate correspondingly, so as to drill the core in the desired azimuth.

In an exemplary embodiment, as shown in FIG. 3, the fixed shell 33 includes a sleeve 331, a fixed flange 332 and a fixed sleeve 333, the fixed flange 332 and the fixed sleeve 333 are respectively arranged at two ends of the sleeve 331 along the axial direction, and the fixed flange 332 and the fixed sleeve 333 are each provided with a through hole for the rotating shaft 31 to pass therethrough.

Taking the example shown in FIG. 3, the sleeve 331, the fixed flange 332 and the fixed sleeve 333 form a cylindrical structure with through holes at both ends, both the rotating shaft 31 and the moving sleeve 32 are arranged in the cylindrical structure, and two ends of the rotating shaft 31 each extend out of the through holes provided on the fixed flange 332 and the fixed sleeve 333, so as to be connectable to other structures at both ends. In order to improve the sealing performance of the connection, there are O-shaped seal rings provided between the sleeve 331 and the fixed sleeve 333 and between the sleeve 331 and the fixed flange 332, respectively, the embodiment of the present application does not limit the forms of sealing between the sleeve 331 and the fixed sleeve 333, and between the sleeve 331 and the fixed flange 332.

In an exemplary embodiment, as shown in FIG. 3, the outer side of the fixed sleeve 333 on the rotating shaft 31, that is, a side of the fixed sleeve 333 away from the sleeve 331 is provided with a rotating disk 34. The rotating disk 34 may be provided with a through hole, and the rotating shaft 31 may extend out of the through hole of the rotating disk 34.

The rotating shaft 31 may be connected to other instrument string members through the rotating disk 34.

In an exemplary embodiment, the first oil inlet 334 and the second oil inlet 335 are provided on the fixed flange 332.

The first oil inlet 334 may directly communicate with the first cavity 71. The second oil inlet 335 may communicate with the second cavity 72 through a channel 73 provided on the sleeve 331.

In an exemplary embodiment, the rotating shaft 31 is provided with a first limiting part 311, one end of the first limiting part 311 abuts against the fixed sleeve 333, a retaining ring is installed on the sleeve 331 and abuts against the other end of the first limiting part 311. Alternatively, as shown in FIG. 3, the rotating shaft 31 is further provided with a second limiting part 312, and the second limiting part 312 abuts against the fixed flange 332.

It is possible to fix and limit an axial position of the rotating shaft 31, so that when the fixed sleeve 333 rotates, it may drive the rotating shaft 31 to rotate without moving the rotating shaft 31 axially. It is possible to arrange the first limiting part 311 on the rotating shaft 31, and by arrangement of the retaining ring, the movement of the rotating shaft 31 in two axial directions (i.e., towards left and right in FIG. 3) can be limited. Moreover, it is possible to limit the movement of the rotating shaft 31 in the two axial directions by providing two limiting parts (the first limiting part 311 and the second limiting part 312). The first limiting part 311 may be a bearing for preventing axial movement, and the second limiting part 312 may be an axial sliding stop sleeve, the embodiment of the present application does not limit implementation forms of the first limiting part 311 and the second limiting part 312.

In an exemplary embodiment, as shown in FIG. 3, a wire channel 313 is provided in the rotating shaft 31.

Wires or cables or the like are connected through the wire channel 313, so that the wires or cables are not affected by the rotation of the instrument.

In an exemplary embodiment, the hydraulic control sub 4 is provided with three magnetic flux gate sensors (not shown in the figure), and orientations of the three magnetic flux gate sensors are perpendicular to each other.

Among them, orientation of one magnetic flux gate sensor is parallel to a central axis of the electronic sub 1, and orientations of the other two magnetic flux gate sensors are perpendicular to the central axis of the electronic sub 1. The three magnetic flux gate sensors are horizontally orthogonal in pairs, and according to a corresponding component relationship of geomagnetic field on each sensor, an actual azimuth angle can be obtained by azimuth discrimination and arctangent function operation. Alternatively, the magnetic flux gate sensors may be arranged in other positions below the rotary sub 3 (as shown in FIG. 1, at a side of the rotary sub 3 close to the hydraulic control sub 4), which is not limited in the embodiment of the present application, as long as it can be ensured that the position of the magnetic flux gate sensors relative to the mechanical sub 5 is fixed, and the angle of the mechanical sub 5 can be detected.

In an exemplary embodiment, the coring instrument 83 further includes a balancing sub (not shown in the figures), which is connected with the hydraulic control sub 4, and the balancing sub is configured to realize a balance between the hydraulic oil pressure inside the instrument and the mud pressure of the downhole formation.

The balancing sub may be arranged in parallel to the hydraulic control sub 4 to reduce the effect on the length of the coring instrument 83. Alternatively, the balancing sub may be arranged between the hydraulic control sub 4 and the mechanical sub 5. The embodiment of the present application does not limit the arrangement position of the balancing sub.

In an exemplary embodiment, the hydraulic control sub 4 is further provided with a reverse thrusting arm 41, which is configured to separate the coring instrument from a wellhole wall. When the coring instrument 83 is stuck downhole, action of the reverse thrusting arm 41 can separate the coring instrument 83 from the wellhole wall.

In actual operation, when the coring instrument 83 reaches a target horizon, an azimuth sensor (i.e., a magnetic flux gate sensor) first measures an azimuth of the drill bit (i.e., the mechanical sub 5), if the azimuth is not a target azimuth, the two supporting and fixing arms 21 at the upper part of the coring instrument 83 are unfolded, the upper part of the instrument is fixed, and then the rotary sub 3 is rotated to drive the drill bit to swing, the azimuth sensor continues to detect the position of the drill bit while the drill bit is swinging. After reaching the specified azimuth, the rotary sub 3 stops rotating, an upper thrusting arm 42 and a lower thrusting arm 51 are unfolded, the two upper supporting and fixing arms 21 are retracted to start the coring action. After the coring operation is completed, the upper thrusting arm 42 and the lower thrusting arm 51 are retracted. If the instrument is stuck downhole, that is, the instrument is stuck with the wellhole wall at a position where the instrument contacts the wellhole wall for coring, which makes it impossible to separate the instrument from the wellhole wall, the reverse thrusting arm 41 (installed on a side of the drill bit) is unfolded, such that the instrument can be peeled off from the wellhole wall. In addition, when the instrument is stuck, with a method of controlling the rotary sub 3 to make the mechanical sub 5 rotate, the instrument can be separated from the wellhole wall.

The coring instrument 83 according to the embodiment of the present application can obtain the accurate azimuth of cores drilled downhole, and can drill cores with specified azimuths downhole. In the coring process, the coring instrument 83 can acquire cores with specified depths and specified azimuths according to the design requirements of geologists, and record, so that the depths of the cores taken downhole and the azimuths of the taken cores can be accurately distinguished on the ground. Geological experts analyze the core, figure out a porosity, a permeability and a saturation of a formation, which together with the azimuth information of the core, may make the analyzed formation data be more accurate, provide more effective information for reservoir evaluation and greatly enhance utilization value of the taken cores.

In the description of the application, it should be noted that the azimuth or position relationships indicated by the terms "upper", "lower", "left", "right" and the like are based on the azimuth or position relationships shown in the drawings, which are only for convenience of describing the embodiments of the application and simplifying the description, rather than indicating or implying that the structure referred has the specific azimuth, or is constructed and operated in the specific azimuth, and thus cannot be interpreted as a limitation on the application.

In the description of the embodiments of the present application, unless otherwise explicitly specified and limited, the terms "connect", "connected with" should be understood in a broad sense, for example, the term "connection" may refer to a fixed connection, a detachable connection or an integrated connection, it may be a direct connection, or an indirect connection through an intermediary, or may be an internal communication between two elements. For those of ordinary skills in the art, the meanings of the above terms in the application can be understood according to actual situations.

The embodiments described herein are exemplary, not restrictive, and for those of ordinary skills in the art that there may be more embodiments and implementation schemes within the scope of the embodiments described herein. Although many possible combinations of features are shown in the drawings and discussed in the detailed description, many other combinations of disclosed features are possible. Unless specifically limited, any feature or element of any embodiment may be used in combination with any other feature or element of any other embodiment or may replace any other feature or element of any other embodiment.

The application includes and contemplates combinations of features and elements known to those of ordinary skills in the art. The disclosed embodiments, features and elements of the application may also be combined with any conventional features or elements to form a unique technical solution defined by the claims. Any feature or element of any embodiment may also be combined with features or elements from other technical solutions to form another unique technical solution defined by the claims. Therefore, any feature shown and/or discussed in the application may be implemented individually or in any suitable combination. Therefore, the embodiments are not to be limited except those made according to the appended claims and their equivalent substitutions. Various modifications and changes may be made within the protection scope of the appended claims.

What is claimed is:

1. A coring instrument, comprising an electronic sub, a support arm sub, a rotary sub, a hydraulic control sub, a mechanical sub and a core reserving drum sub which are connected in sequence,
   wherein the mechanical sub is configured to complete operations of thrusting, coring, core-breaking and core length measurement; the core reserving drum sub is configured to reserve a taken core; the electronic sub is configured to communicate with a ground control system and identify an azimuth of a core taken downhole; the rotary sub is configured to rotate the mechanical sub to a specified azimuth for rotary coring; the hydraulic control sub is configured to provide power for the rotary sub and the mechanical sub; the support arm sub is configured to fix a downhole position of the coring instrument,
   the rotary sub comprises a rotating shaft, a moving sleeve and a fixed shell, wherein the moving sleeve is sleeved outside the rotating shaft and is in threaded connection with the rotating shaft; the rotating shaft and the moving sleeve are arranged in the fixed shell, and two ends of the rotating shaft extend out of two ends of the fixed shell respectively, and the rotating shaft is axially limited in the fixed shell; an end face of the fixed shell close to the hydraulic control sub is provided with an oil inlet, and the hydraulic control sub is configured to inject hydraulic oil into the fixed shell through the oil inlet to push the moving sleeve to move axially, the moving sleeve drives the rotating shaft to rotate, and thus controls a rotation of the mechanical sub through the rotating shaft;
   wherein the oil inlet comprises a first oil inlet and a second oil inlet located on two sides of the rotating shaft, the moving sleeve is dynamically sealed with the fixed shell, and a sealed first cavity and a sealed second cavity are formed on two sides of the moving sleeve, the first oil inlet communicates with the first cavity, and the second oil inlet communicates with the second cavity through a channel;
   wherein a wire channel is provided in the rotating shaft;
   wherein the support arm sub comprises a supporting and fixing arm, the supporting and fixing arm at the upper part of the coring instrument is unfolded, an upper part of the coring instrument is fixed, and then the rotary sub is rotated.

2. The coring instrument according to claim 1, wherein the fixed shell comprises a sleeve, a fixed flange and a fixed sleeve, and the fixed flange and the fixed sleeve are respectively arranged at two ends of the sleeve along an axial direction,
   the fixed flange and the fixed sleeve are each provided with a through hole for the rotating shaft to pass through.

3. The coring instrument according to claim 2, wherein O-shaped seal rings are arranged between the sleeve and the fixed sleeve, and between the sleeve and the fixed flange respectively.

4. The coring instrument according to claim 2, wherein the first oil inlet and the second oil inlet are provided on the fixed flange.

5. The coring instrument according to claim 4, wherein the rotating shaft is provided with a first limiting part, and one end of the first limiting part abuts against the fixed sleeve,
   a retaining ring is installed on the sleeve and abuts against the other end of the first limiting part; or, the rotating shaft is also provided with a second limiting part, and the second limiting part abuts against the fixed flange.

6. The coring instrument according to claim 5, wherein the first limiting part is a bearing for preventing axial movement, and the second limiting part is an axial sliding stop sleeve.

7. The coring instrument according to claim 2, wherein a rotating disk is provided at a side of the fixed sleeve away from the sleeve.

8. The coring instrument according to claim 7, wherein the rotating shaft is connected with other instrument string members through the rotating disk.

9. The coring instrument according to claim 1, wherein the hydraulic control sub is provided with three magnetic flux gate sensors, and orientations of the three magnetic flux gate sensors are perpendicular to each other.

10. The coring instrument according to claim 1, further comprising a balancing sub which is connected with the hydraulic control sub, wherein the balancing sub is configured to realize pressure balance between pressure inside the instrument and a pressure of a downhole formation.

11. The coring instrument according to claim 10, wherein the balancing sub is arranged in parallel to the hydraulic control sub, or the balancing sub is arranged between the hydraulic control sub and the mechanical sub.

12. The coring instrument according to claim 1, wherein the hydraulic control sub is further provided with a reverse thrusting arm which is configured to separate the coring instrument from a wellhole wall.

13. The coring instrument according to claim 2, wherein the hydraulic control sub is provided with three magnetic flux gate sensors, and orientations of the three magnetic flux gate sensors are perpendicular to each other.

14. The coring instrument according to claim 3, wherein the hydraulic control sub is provided with three magnetic flux gate sensors, and orientations of the three magnetic flux gate sensors are perpendicular to each other.

15. The coring instrument according to claim 4, wherein the hydraulic control sub is provided with three magnetic flux gate sensors, and orientations of the three magnetic flux gate sensors are perpendicular to each other.

16. The coring instrument according to claim 5, wherein the hydraulic control sub is provided with three magnetic flux gate sensors, and orientations of the three magnetic flux gate sensors are perpendicular to each other.

17. The coring instrument according to claim 6, wherein the hydraulic control sub is provided with three magnetic flux gate sensors, and orientations of the three magnetic flux gate sensors are perpendicular to each other.

* * * * *